Aug. 12, 1958 E. A. TAFT, JR., ET AL 2,847,544

SILICON SEMICONDUCTIVE DEVICES

Filed Dec. 16, 1955

Inventors:
Ernest A. Taft, Jr.,
Fordyce H. Horn,
by Paul A. Frank
Their Attorney.

United States Patent Office 2,847,544

Patented Aug. 12, 1958

2,847,544

SILICON SEMICONDUCTIVE DEVICES

Ernest A. Taft, Jr., and Fordyce Hubbard Horn, Schenectady, N. Y., assignors to General Electric Company, a corporation of New York Application December 16, 1955, Serial No. 553,461

5 Claims. (Cl. 201—63)

Figure 1:
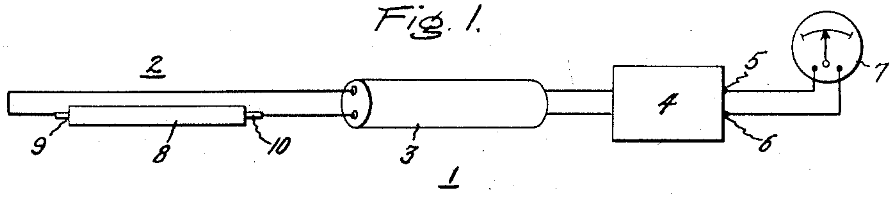

This invention relates to silicon semiconductive devices and more particularly to such silicon devices suitable for use as current control elements by virtue of their extreme sensitivity to heat and radiation.

In the electric control art there exists a great need for accurate, sensitive devices responsive to either heat or incident radiation to control the magnitude of electric currents flowing therethrough. Utilizing such devices, it becomes possible to control complicated electrically operated systems which depend for their operation upon the maintenance of a particular predetermined temperature or, alternatively, require a particular operation to be performed when the intensity of incident radiation reaches a certain level. Numerous current controlling devices sensitive to light or heat are unsatisfactory due either to a lack of sensitivity or a lack of accuracy. Many of the devices which are sufficiently sensitive are non-linear in their thermal or radiation response and thus suffer a loss of accuracy. On the other hand, devices which are linear in their response often do not undergo a sufficient conductivity change with varying temperature or light level and are consequently insensitive.

Accordingly, one object of the invention is to provide thermo-sensitive and photo-sensitive current control devices which are unusually sensitive and at the same time highly accurate and reliable.

A further object of the invention is to provide silicon semiconductive devices, the resistivity of which, is unusually thermosensitive over a wide range of temperatures.

Another object of the invention is to provide silicon semiconductive devices exhibiting unusually pronounced photo-conductive properties, namely a high degree of change of resistivity for different intensities of impinging light, and particularly infra-red light over a wide range of temperatures.

A further object of the invention is to provide thermo-sensitive and photo-sensitive current control devices having very high resistivities at the ranges at which they may serve to control electrical circuits.

Briefly stated, in accord with our invention, we provide silicon semiconductive current controlling devices in the form of high purity silicon monocrystalline bodies impregnated with a trace of high purity manganese having a pair of spaced electrodes in contact therewith.

The term "trace of manganese" used in this specification and in the appended claims is used to indicate the presence of $10^{14}$ to $10^{15}$ atoms of manganese per cubic centimeter of silicon. The term "high purity silicon" is used to mean silicon having a total concentration of electrically significant impurities not exceeding $2\times10^{14}$ atoms thereof per cubic centimeters of silicon. Such silicon may also have a number of uncompensated acceptor activator atoms therein not exceeding $10^{14}$ acceptor activator atoms per cubic centimeter of silicon. This high purity silicon has resistivity above 50 ohms centimeters at 25° C. The term "high purity manganese" is used to connote manganese having less than 10 parts per million of either the donor activator elements of group V or the acceptor activator elements of group III of the periodic table.

The addition of high purity manganese to high purity silicon bodies greatly enhances the thermo-conductive and photo-conductive properties thereof and changes the conductivity characteristics thereof to N-type, indicating its characteristics as a donor activator impurity. Additionally, the addition of traces of high purity manganese to high purity silicon, in accord with this invention, enables the provision of thermal control and photo control elements which are extremely sensitive to changes in temperatures and incident radiation. The addition of manganese to the silicon bodies of this invention additionally provides high resistivity silicon semiconductive bodies which exhibit highly desirable resistivity levels at room temperature.

The novel features believed characteristic of the invention are set forth in the appended claims. The invention itself, however, together with further objects and advantages thereof, may best be understood by referring to the following description taken in connection with the accompanying drawing in which:

Figure 1 illustrates a thermo-sensitive device constructed in accord with the invention.

Figures 2, 3:
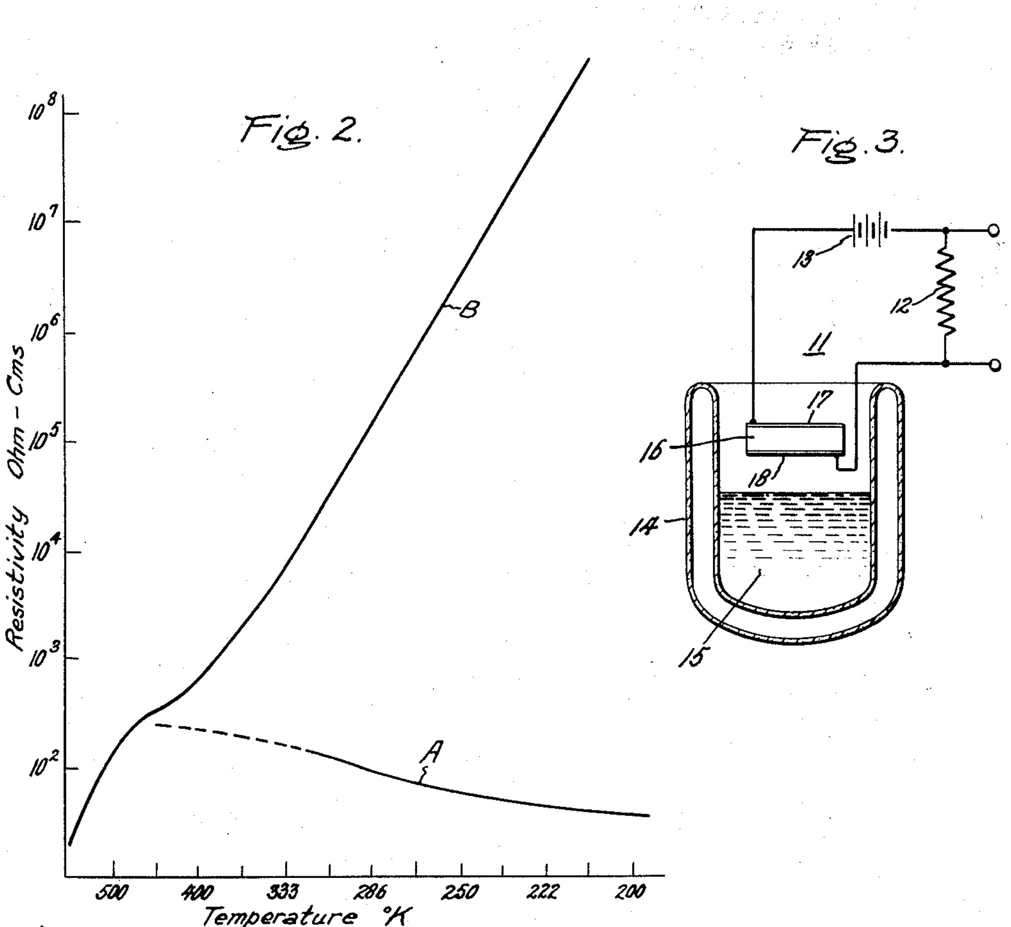

Figure 2 contains a group of curves illustrating the improvement in the thermosensitivity of the silicon bodies of the invention due to the presence of manganese therein.

Figure 4:
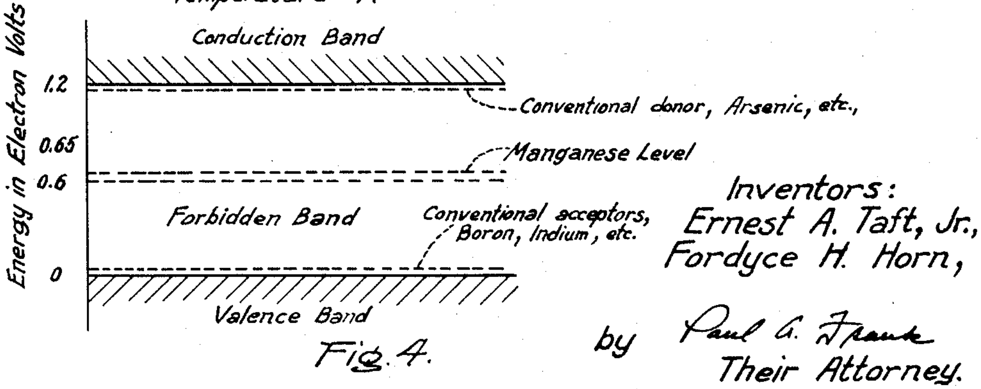

Figure 3 illustrates a photo-sensitive device constructed in accord with the invention, and Figure 4 is an energy level diagram for silicon illustrating the scientific principles upon which the operation of the manganese impregnated silicon bodies of the invention is based.

In Figure 1 of the drawing a thermosensitive control or indicating device illustrative of one embodiment of the invention is indicated generally as 1. Thermosensitive device 1 comprises a thermoconductive element 2, a probe shaft 3, and a bridge and amplifier circuit 4 which may also contain a source of potential for causing the flow of an electric current through thermoconductive body 2. Since bridge and amplifier circuits are well known to the art and do not constitute a part of our invention the circuit is not shown in detail.

In operation, an electric current is caused to flow through thermoconductive body 2 by a source of potential contained within bridge and amplifier circuit 4. The bridge and amplifier circuit is adjusted so that no voltage appears across the output terminals 5 and 6 thereof. A null type current indicating meter 7 is connected to the output of bridge and amplifier circuit 4. By proper adjustment of variable impedances within bridge and amplifier circuit 4, meter 7 may be caused to indicate zero current for any preselected temperature within the operating range of the devices of this invention. While this range includes any temperatures below 125° C. a preferable operating range is from −75° C. to 125° C. The face of meter 7 may be calibrated to indicate temperature deviations from the preselected mean. Alternatively meter 7 may be replaced by a load resistance. In this case the potential difference through the load resistance may be used as a signal to operate a suitable control circuit which becomes operative when the thermoconductive element 2 indicates a temperature deviation from the preselected mean. The magnitude and polarity of the potential difference developed across such a load resistance is indicative of the degree of control to be exercised.

Thermoconductive element 2 comprises a high purity silicon bar 8 which is impregnated with a trace of high purity manganese, and a pair of low resistance contacts 9 and 10 to opposite ends of bar 8. Silicon bar 8 is monocrystalline in structure and may conveniently be the order of ½" long and $\frac{1}{16}$" wide and thick, although the physical dimensions thereof may be changed commensurate with the requirements of the circuit. Silicon bar 8 is preferably substantially free from all electrically significant impurities other than manganese. However, uncompensated activator impurities such as boron, indium, aluminum or gallium to the extent of about $10^{14}$ atoms per cubic cm. of such impurities or less, corresponding to resistivities of approximately 50 ohm cm. or higher before the addition of manganese may be present. The manganese is incorporated into the silicon in relatively minute amounts, preferably from $10^{14}$ to $10^{15}$ atoms of manganese per cubic cm. of silicon.

Silicon bar 8 may be easily provided by extraction from a monocrystalline ingot grown by the Czochralski seed crystal withdrawal method during solidification from a melt of high purity silicon material having a solidified resistivity of about 50 ohm-cm. or higher at 25° C., to which has been added from .02 to 2% by weight of high purity manganese. By high purity manganese is meant manganese having less than 10 parts per million of any of the electrically significant donor or acceptor impurity of groups V and III respectively of the periodic table of the elements. Because of the limited solubility of manganese in silicon, less than $10^{16}$ atoms of manganese per cubic centimeter of manganese will be assimilated by the growing ingot. Even additions of minute traces of manganese corresponding, for example, to the presence of $10^{14}$ atoms of manganese per cubic cm. of silicon appear to have pronounced effect upon, and cause enhancement of, the thermoconductive and photoconductive properties of the silicon material. In general, it may be stated that the greater the purity of the silicon in bar 8, the less the amount of manganese that is necessary to produce the same enhancement of the thermoconductive properties and photoconductive properties of the resultant crystal.

Contacts 9 and 10 comprise materials which make good non-rectifying contacts with N-type silicon. Such materials preferably include gold, rhodium, nickel and tin, although any other material which may be used to form a non-rectifying contact with N-type silicon at temperatures less than 300° C. may be utilized. One preferred method of applying contacts 9 and 10 to silicon crystal 8 is by electroplating. Although this method is preferred, any method by which suitable non-rectifying contact making materials may be applied to silicon bar 8 without raising the temperature of bar 8 above 300° C. is suitable.

The enhancement of the thermoconductive properties of silicon bar 8 resulting from the impregnation thereof with manganese in accord with the invention is illustrated by the curves of Figure 2. In Figure 2, curve A is a plot of the resistivity vs. temperature of a silicon bar extracted from an ingot grown from a melt of high purity silicon to which no manganese has been added. Curve B, on the other hand, is a plot of the resistivity vs. temperature curve of a silicon bar extracted from an ingot grown from the same quality silicon melt after approximately 40 milligrams of manganese were added for each 20 grams of silicon in the melt. As can be seen from these curves the silicon bar extracted from the pure silicon ingot exhibits little change in resistivity over the temperature range of from −100 to +200° C. On the other hand, the sample extracted from the manganese impregnated ingot exhibits a very sharp increase of resistivity for decreases in temperature over this temperature range. As may be seen from the slope of curve B, the resistivity of the manganese impregnated silicon bar 8 varies from approximately $10^3$ ohm-cm. at 125° C. to approximately $10^9$ ohm cm. at −75° C.

The slope of curve B of Figure 2 indicates an activation energy of 0.55 electron volt for the N-type manganese impregnated silicon body. The manganese induced impurity level responsible for this activation energy is very close, to the center of the forbidden band in silicon, and causes the thermoconductive bodies of the invention to closely approach the maximum temperature dependence obtainable from silicon bodies.

The extremely high sensitivity of the resistivity of the devices of this invention to temperature changes is of great utility. The electric current control devices constructed in accord with this invention are extremely sensitive due to the great slope of curve B on Figure 2 of the drawing.

By selecting a load in the circuit of bar 8 having approximately the same order of resistance or impedance magnitude as that of silicon bar 8 over the range of temperature to be measured or modified by the thermoconductive device 2, the change in resistance of thermoconductive body as a result in any change in temperature thereof immediately appears as a considerable change in current through the load. Devices such as thermoconductive body 8 are particularly useful, since the range of temperatures over which the thermoconductive properties are most pronounced encompasses room temperature and extends for at least 100° C. above and below that point. Such devices therefore are highly thermosensitive at the temperature at which the need for thermosensitive current control devices is greatest. In addition, the absolute magnitude of resistivity of such devices at normal operating temperatures is easily matched in impedance matching circuits to secure optimum efficiency. For example, referring to curve B of Figure 2, at room temperature (25° C.) the bulk electrical resistivity of silicon bar 8 is of the order of $10^5$ ohm cm.

In one specific example of the preparation of manganese impregnated silicon devices in accord with the invention, 20 grams of the highest purity silicon available, having a resistivity of 100 ohm-centimeters, was placed in a heated quartz crucible and melted. To this melt was added 10 milligrams of high purity manganese having less than 10 parts per million of either aluminum, gallium, indium, boron, arsenic, antimony or phosphorus. An ingot of silicon was then grown from this melt by the Czochralski seed crystal withdrawal method. The ingot was then cut into transverse segments $\frac{1}{16}$ inch thick with a diamond saw. One segment was cut to form a wafer $\frac{1}{16}$ inch wide and thick and ½ inch long. Rhodium contacts were then electroplated to opposite ends of the wafer. This wafer then exhibited the thermosensitive properties shown by curve B of Figure 2 of the drawing.

In Figure 3 of the drawing there is shown a photoconductive cell 11 embodying the invention and connected in a suitable electrical circuit including output resistor 12 and a battery 13. Photoconductive cell 11 may be maintained at any desirable temperature by immersing within an insulated vessel 14 containing a thermal fluid 15 such as liquid nitrogen, with a stable fixed temperature. Photoconductive cell 11 comprises an N-type silicon crystal 16 which may conveniently be ¼" long and wide and about 0.050" thick, and electrodes 17 and 18 contacting the opposite major surfaces thereof. Upper electrode 17 is conveniently made in the form of a ring in order that incident light rays may reach and activate silicon wafer 16. Lower electrode 18 may be of any shape and thickness desired. Both electrodes 17 and 18 may comprise metals which make non-rectifying connections to silicon wafer 16 and which may be applied at a temperature less than 300° C.

While electrodes 17 and 18 may comprise any such material, they preferably comprise thin electrolytically deposited layers of gold, rhodium, nickel or tin.

Photosensitive devices constructed in accord with this invention exhibit a high response to incident light; that is, the devices of the invention undergo a substantial decrease in resistivity when exposed to incident light. Due, however, to the position of the manganese induced impurity level within the silicon energy level scheme, the photosensitive devices of the invention are particularly sensitive to infra-red radiation particularly infra-red radiation having a wavelength up to 2.5 microns.

The intensity of light necessary to bring about a marked change in resistivity in the photosensitive devices of the invention is not very great. For example, in the case of one sample being tested at the temperature of liquid nitrogen, the resistance of the body fell from $4\times10^9$ ohms in the dark to $10^5$ ohms when irradiated with the light of a G. E. #1493 instrument bulb operating at 10 volts potential. This change in resistivity represents a change of four decades and is indicative of the high photosensitivity of the devices of the invention.

More quantitatively it has been determined experimentally that the photosensitive devices of the invention respond to and give a noticeable change in resistivity with light input energy as low as $10^{-9}$ watts.

In Figure 4 of the drawing there is shown a schematic representation of the energy level scheme for silicon with which the electrical characteristics of the devices of the invention may be explained. In the silicon energy level diagram of Figure 4 the valence, forbidden, and conduction bands are represented diagrammatically and identified with appropriate captions. The valence band represents the energies of electrons bound to the atoms of the crystal lattice. The conduction band represents a continuum of electron energies within which electrons may move as current carriers. The forbidden band, located between the valence and conduction bands, represents energy levels which may not be occupied by electrons of the crystal lattice in the absence of lattice imperfections or chemical impurities. The impurities most commonly added to silicon to cause the introduction of impurity levels or states within the forbidden band are the well known donor activator impurities located in group V of the periodic table, such as antimony, arsenic, and phosphorus and the well known acceptor activator impurities located in group III of the periodic table such as boron, indium, gallium and aluminum. Of these impurities the donor induced levels lie less than 0.06 electron volt below the conduction band while the acceptor induced levels lie less than 0.20 electron volt above the valence band. The presence of even extremely small quantities of these particular donors and acceptors in pure silicon may result in greatly reducing the resistivity of silicon from an intrinsic resistivity of greater than $10^5$ ohm-centimeters at room temperature to a value of less than 1 ohm-centimeter at room temperature. For this reason, the presence of such conventional donors or acceptors in the silicon devices of the invention must be kept to an absolute minimum in order that the effects of the manganese impregnation be observable. It is for this reason that the purity of the silicon and manganese utilized in the devices of the invention are maintained at the values set forth hereinbefore.

As may be seen from Figure 4 of the drawing, manganese induces a deep-lying energy level into silicon. This level is located at approximately 0.55 electron volt below the conduction band and is believed to be a donor level. This induced energy level differs from the donor levels induced by group V elements into the silicon energy level scheme by its much greater distance, energy wise, from the conduction band. The unusual thermosensitive and photosensitive characteristics of the device of this invention are believed due to the donor level introduced into the silicon energy scheme by the added manganese atoms.

As an example of this mechanism consider a thermosensitive N-type silicon monocrystalline body such as that shown in Figure 1 of the drawing. In a conducting N-type silicon monocrystalline body current is carried primarily by electrons which have been raised in energy to the conduction band. At room temperature there is, in the silicon bodies of the invention, a sufficient number of conduction electrons, so raised in energy, to allow the passage of a fair current as represented by the relatively low value of $10^5$ ohm-centimeters shown in curve B of Figure 2 of the drawing at room temperature (25° C.). At this temperature there is a continuing interchange of electrons between the conduction band and the manganese induced level. The probability that electrons will remain a long time at the manganese induced level is, however, small and at room temperature a sufficient number of electrons are available within the conduction band for relatively high current conduction. As the temperature of the manganese impregnated silicon body is lowered the probability of electrons remaining in the manganese induced levels increases. Thus fewer electrons are available as conduction carriers. This is to be contrasted with the low energy levels introduced into silicon by the conventional donors of group V. The probabilities of electron entrapment at these lower levels remains insignificantly small with the decrease in temperature even to the temperature of liquid nitrogen. The decrease in available conduction carriers with decreasing temperatures of the manganese impregnated devices of the invention results in a very high temperature dependance of resistivity as illustrated in curve B of Figure 2 of the drawing.

When maintained at low temperature, a manganese impregnated silicon device such as is illustrated in Figure 3 of the drawing possesses a high resistivity due to the high probability of electrons remaining in the manganese induced level at low temperature. When light falls upon the photoconductive device of the invention, more electrons become available as conduction carriers.

While the above energy level scheme has been discussed with a possibility of explaining the scientific phenomena upon which the thermosensitive and photosensitive devices of the invention are based, it is offered by way of explanation only, and is not intended to affect the scope or validity of the appended claims in case some other explanation should, at a later date, be found more accurate or comprehensive.

While our invention has been described with reference to particular embodiments thereof, it will be understood that many changes and modifications may be made by those skilled in the art without departing from the invention. We intend therefore by the appended claims to cover all such changes and modifications as fall within the true spirit and scope of the invention.

What we claim as new and desire to secure by Letters Patent of the United States is:

1. A semiconductor control member comprising a monocrystalline body of silicon having therein a number of uncompensated acceptor activator impurities not exceeding $10^{14}$ atoms thereof per cu./cm. of silicon and impregnated with from $10^{14}$ to $10^{15}$ atoms per cubic centimeter of manganese containing less than 10 parts per million of any material selected from the group consisting of donor and acceptor activator impurities.

2. A semiconductor current control device comprising a monocrystalline body of silicon having therein a number of uncompensated acceptor activator impurities not exceeding $10^{14}$ atoms thereof per cu./cm. of silicon and impregnated with from $10^{14}$ to $10^{15}$ atoms per cubic centimeter of manganese containing less than 10 parts per million of any material selected from the group consisting of donor and acceptor activator impurities, and a pair of non-rectifying electrical contacts connected to different surface portions of said body.

3. An electric current control device comprising a monocrystalline body of high purity silicon having therein a number of uncompensated acceptor activator impurities not exceeding $10^{14}$ atoms thereof per cubic centimeter of silicon and impregnated with $10^{14}$ to $10^{15}$ atoms per cubic centimeter of manganese containing less than 10 parts per million of any material selected from the group consisting of donor and acceptor activator impurities, and a pair of spaced electrical contacts connected thereto.

4. An electric current control device comprising a monocrystalline body of high purity silicon having therein a number of uncompensated acceptor activator impurities not exceeding $10^{14}$ atoms thereof per cubic centimeter of silicon and impregnated with $10^{14}$ to $10^{15}$ atoms per cubic centimeter of manganese containing less than 10 parts per million of any material selected from the group consisting of donor and acceptor activator impurities, and a pair of non-rectifying electrical contacts of a material selected from the group consisting of rhodium, gold, nickel and tin, connected to spaced surface portions of said body.

5. A photosensitive electric current control device comprising a monocrystalline body of high purity silicon having therein a number of uncompensated acceptor activator impurities not exceeding $10^{14}$ atoms thereof per cubic centimeter of silicon, and impregnated with $10^{14}$ to $10^{15}$ atoms per cubic centimeter of manganese containing less than 10 parts per million of any material selected from the group consisting of donor and acceptor activator impurities, a first non-rectifying contact electrode having an aperture therein contacting one major surface portion of said body, and a second non-rectifying contact electrode contacting a second surface portion of said body.

References Cited in the file of this patent

UNITED STATES PATENTS 2,629,672 Sparks ---------------- Feb. 24, 1953

OTHER REFERENCES

Dunlap: Phys. Rev., vol. 91, No. 1, July 1, 1953, page 208.

Taft: Phys. Rev., vol. 93, No. 1, January 1, 1954, page 64.

Woodbury: Phys. Rev. vol. 100, No. 2, October 15, 1955 (received date January 23, 1955), pages 659–662.